(12) United States Patent
Hupkes et al.

(10) Patent No.: US 12,230,830 B2
(45) Date of Patent: Feb. 18, 2025

(54) AEROSOL GENERATION DEVICE WITH BATTERY VENTING SYSTEM

(71) Applicant: JT International SA, Geneva (CH)

(72) Inventors: Ernst Hupkes, Kampen (NL); Claude Zominy, Copponex (FR)

(73) Assignee: JT International S.A. (CH)

( * ) Notice: Subject to any disclaimer, the term of this patent is extended or adjusted under 35 U.S.C. 154(b) by 314 days.

(21) Appl. No.: 17/632,703

(22) PCT Filed: Aug. 7, 2020

(86) PCT No.: PCT/EP2020/072326
§ 371 (c)(1),
(2) Date: Feb. 3, 2022

(87) PCT Pub. No.: WO2021/023890
PCT Pub. Date: Feb. 11, 2021

(65) Prior Publication Data
US 2022/0285785 A1 Sep. 8, 2022

(30) Foreign Application Priority Data

Aug. 8, 2019 (EP) .................................... 19190867
Aug. 29, 2019 (EP) .................................... 19194403
Nov. 28, 2019 (EP) .................................... 19211987

(51) Int. Cl.
*H01M 50/30* (2021.01)
*A24F 40/40* (2020.01)
(Continued)

(52) U.S. Cl.
CPC ........... *H01M 50/394* (2021.01); *A24F 40/40* (2020.01); *H01M 50/3425* (2021.01); *H01M 50/392* (2021.01); *H01M 2220/30* (2013.01)

(58) Field of Classification Search
CPC ............. H01M 50/394; H01M 50/392; H01M 50/3425; H01M 2220/30; A24F 40/40
(Continued)

(56) References Cited

U.S. PATENT DOCUMENTS

2011/0186655 A1  8/2011  Ghavami-Nasr et al.
2013/0302656 A1  11/2013  Partington et al.
(Continued)

FOREIGN PATENT DOCUMENTS

CN  102781791 A  11/2012
CN  103348505 A  10/2013
(Continued)

OTHER PUBLICATIONS

Search Report dated Jan. 26, 2024 from the Office Action for Chinese Application No. 202080051074.1 Issued Jan. 30, 2024, pp. 1-3.
(Continued)

*Primary Examiner* — Gary F Paumen
(74) *Attorney, Agent, or Firm* — Lerner David LLP

(57) ABSTRACT

An aerosol generating device including: a housing having a mouth end and an opposing end, the opposing end having a vent hole; a battery within the housing, the battery having a vent point in an outer surface of the battery, the vent point arranged such that fluid is released preferentially from the vent point during degassing of the battery; and a fluid directing arrangement within the housing. The fluid directing arrangement is configured to define a fluid flow path from the vent point of the battery to the vent hole of the housing.

16 Claims, 11 Drawing Sheets

(51) Int. Cl.
    *H01M 50/342* (2021.01)
    *H01M 50/392* (2021.01)
(58) Field of Classification Search
    USPC .......................................................... 131/329
    See application file for complete search history.

(56) References Cited

U.S. PATENT DOCUMENTS

| | | | |
|---|---|---|---|
| 2015/0020831 A1* | 1/2015 | Weigensberg | A24F 40/90 |
| | | | 131/329 |
| 2015/0077981 A1 | 3/2015 | Cormack | |
| 2015/0079428 A1* | 3/2015 | Kwon | H01M 10/658 |
| | | | 429/56 |
| 2016/0073692 A1 | 3/2016 | Alarcon et al. | |
| 2016/0360784 A1 | 12/2016 | Liu | |
| 2016/0374392 A1* | 12/2016 | Liu | A24F 40/51 |
| | | | 392/404 |
| 2017/0006920 A1 | 1/2017 | Liu | |
| 2017/0119052 A1 | 5/2017 | Williams et al. | |

FOREIGN PATENT DOCUMENTS

| | | |
|---|---|---|
| CN | 108366628 A | 8/2018 |
| CN | 207784285 U | 8/2018 |
| CN | 208624652 U | 3/2019 |
| EP | 2814081 A2 | 12/2014 |
| JP | 201215121 A | 1/2012 |
| JP | 2018527913 A | 9/2018 |
| WO | 2015043048 A1 | 4/2015 |
| WO | 2015109454 A1 | 7/2015 |
| WO | 2015120638 A1 | 8/2015 |
| WO | 2016008150 A1 | 1/2016 |
| WO | 2017025500 A1 | 2/2017 |

OTHER PUBLICATIONS

International Search Report for PCT/EP2020/072326 dated Oct. 21, 2020. 4 pgs.

* cited by examiner

Fig. 3A
Fig. 3B
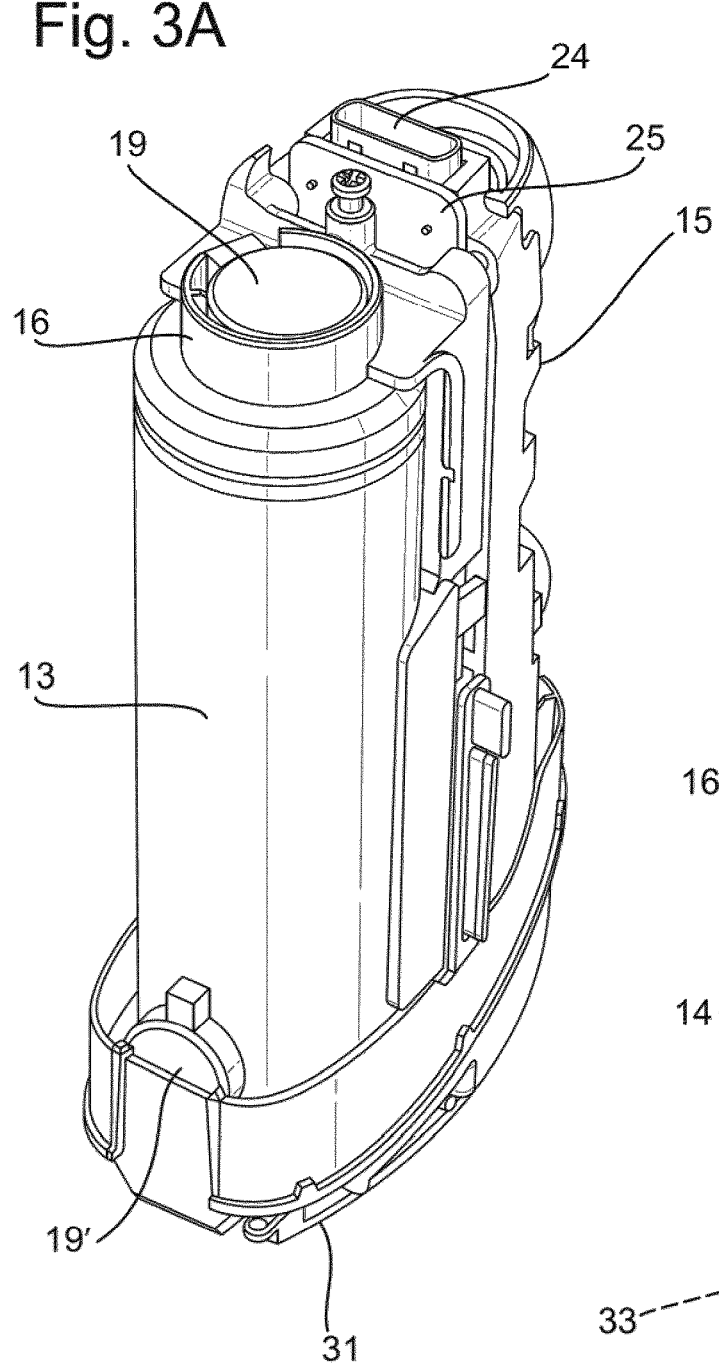
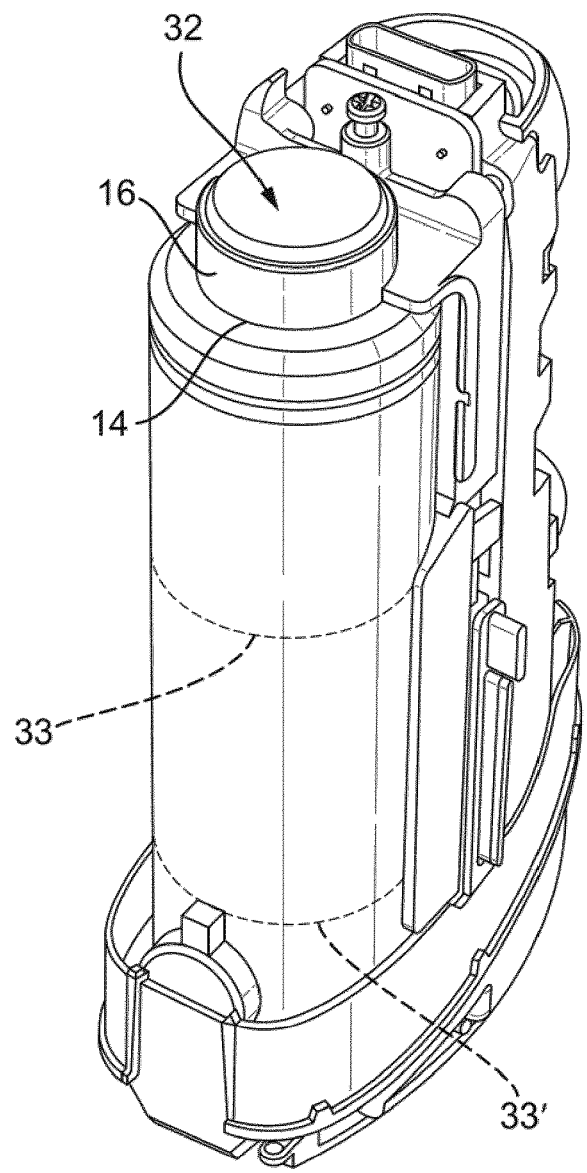

AEROSOL GENERATION DEVICE WITH BATTERY VENTING SYSTEM

CROSS-REFERENCE TO RELATED APPLICATIONS

The present application is a national phase entry under 35 U.S.C. § 371 of International Application No. PCT/EP2020/072326, filed Aug. 7, 2020, published in English, which claims priority to European Application No. 19211987.3 filed Nov. 28, 2019, European Application No. 19194403.2 filed Aug. 29, 2019, and European Application No. 19190867.2 filed Aug. 8, 2019, the disclosures of which are incorporated herein by reference.

FIELD OF THE DISCLOSURE

The present disclosure relates to an aerosol generation device. The disclosure is particularly applicable to a portable aerosol generation device, which may be self-contained and low temperature. Such devices may heat, rather than burn, tobacco or other suitable aerosol substrate materials by conduction, convection, and/or radiation, to generate an aerosol for inhalation.

BACKGROUND TO THE DISCLOSURE

The popularity and use of reduced-risk or modified-risk devices (also known as vaporisers) has grown rapidly in the past few years as an aid to assist habitual smokers wishing to quit smoking traditional tobacco products such as cigarettes, cigars, cigarillos, and rolling tobacco. Various devices and systems are available that heat or warm aerosolisable substances as opposed to burning tobacco in conventional tobacco products.

A commonly available reduced-risk or modified-risk device is the heated substrate aerosol generation device or heat-not-burn device. Devices of this type generate an aerosol or vapour by heating an aerosol substrate that typically comprises moist leaf tobacco or other suitable aerosolisable material to a temperature typically in the range 150° C. to 300° C. Heating an aerosol substrate, but not combusting or burning it, releases an aerosol that comprises the components sought by the user but not the toxic and carcinogenic by-products of combustion and burning. Furthermore, the aerosol produced by heating the tobacco or other aersolisable material does not typically comprise the burnt or bitter taste resulting from combustion and burning that can be unpleasant for the user and so the substrate does not therefore require the sugars and other additives that are typically added to such materials to make the smoke and/or vapour more palatable for the user.

It is desirable to provide a device with improved safety and/or reliability.

There is a safety issue with certain aerosol generating devices powered by certain types of battery that can experience leaks or degassing events where a fluid (liquid or gas) is produced from the battery. For example, lithium ion batteries are known to experience degassing events. These events can be slow or small events that fall within normal behaviour of the battery, and do not necessarily compromise the functionality of the aerosol generation device. However, these events can also be rapid events that cause high pressures and damage the device or even cause the device to explode. Moreover, due to the pressure build-up inside a case of the battery, some solid material may be ejected. Ejected material may come from the external or internal components of the battery such as pieces of the top and bottom cap, top and bottom insulator, gasket, steel can, cathode and anode, separator, steel can, portion of aluminum or copper foils with their coating, jelly roll and the electrodes for example. Ejected material has usually a very high temperature in the range of 400° C. to 850° C. or more and may trigger a fire in the neighborhood or harm a user. Battery self-destruction may occur during charging, discharging and therefore during the utilization of the aerosol generation device by a user. This is particularly dangerous if the device is held in a user's hand or is close to the user's face. Additionally, the leaked or degassed fluid may be a hazardous chemical such as a flammable or toxic organic solvent.

SUMMARY OF THE DISCLOSURE

According to a first aspect of the disclosure, there is provided an aerosol generating device comprising: a housing comprising a mouth end and an opposing end, the opposing end comprising a vent hole; a battery within the housing, the battery comprising a vent point in an outer surface of the battery, the vent point arranged such that fluid is released preferentially from the vent point during degassing of the battery; a fluid directing arrangement within the housing. The fluid directing arrangement is configured to define a fluid flow path from the vent point of the battery to the vent hole of the housing.

Optionally, the vent point is positioned on one end of the battery and the fluid directing arrangement comprises an annular support positioned between said end of the battery and the housing vent hole such that a fluid flow path is directed through the annular support from the battery vent point towards the housing vent hole.

Optionally, the vent point is positioned on one end of the battery, and the device further comprises a vibrator element positioned adjacent to said end of the battery; wherein the fluid directing arrangement comprises a vibrator element support which is configured to hold the vibrator element and direct a fluid flow path around the vibrator element from the battery vent point to the housing vent hole.

Optionally, the fluid directing arrangement further comprises a baffle positioned between a side surface of the battery and an adjacent inner surface of the housing to seal a space between the battery and housing and restrict a fluid flow towards the mouth end of the housing.

Optionally, the baffle is positioned towards the mouth end along an elongate side of the aerosol generation device.

Optionally, the baffle conforms to the shape of the battery.

Optionally, the baffle comprises a concave surface directed towards the vent hole in the housing such that a fluid flow towards the baffle is redirected in the opposing direction towards the vent hole.

Optionally, the fluid directing arrangement further comprises a deflector plane positioned adjacent to the vent point of the battery, the deflector plane configured to redirect a fluid towards the baffle.

Optionally, the aerosol generation device further comprises a vibrator element positioned between a side surface of the battery and an adjacent inner surface of the housing Optionally, the baffle is a support for the vibrator element positioned between the side surface of the battery and the adjacent inner surface of the housing.

Optionally, the vibrator element is mounted in a rubber gasket.

Optionally, the vibrator element is arranged to transmit vibrations to the housing.

Optionally, the vibrator element is configured to vibrate when the heater is initially turned on, when the heater reaches a predetermined temperature, or after the heater has been on for a predetermined duration.

Optionally, the gasket is arranged to reduce the transfer of vibrations from the vibrator element to the battery or the heater sub-assembly.

Optionally, the aerosol generating device further comprises an absorbent pad positioned adjacent to the vent point of the battery.

Optionally, the absorbent pad is annular and positioned adjacent to the vent point of the battery.

Optionally, the fluid directing arrangement comprises an annular support and the absorbent pad is positioned within the annular support.

Optionally, the aerosol generating device further comprises a sticker positioned over the vent hole on an outer surface of the housing, where the sticker is configured to be displaced to open the vent hole during degassing of the battery.

Optionally, the aerosol generating device further comprises a cavity within the housing adjacent to the battery vent point configured to receive a fluid expelled from the battery during degassing.

Optionally, the aerosol generating device further comprises a battery support frame which holds the battery, the battery support frame positioned across the internal volume of the housing so as to seal the battery in one portion of the internal volume of the housing.

Optionally, the vent hole comprises a supporting element arranged across the vent hole to prevent opposing edges of the vent hole from closing.

Optionally, the aerosol generating device further comprises a heater sub-assembly comprising a heater and a heating chamber with an opening at the mouth end of the body, wherein the heating chamber is arranged to receive a consumable to be heated and the aerosol generating device further comprises control circuitry configured to control the heater to heat the heating chamber to a predetermined temperature to heat the consumable and generate an aerosol.

Optionally, the aerosol generating device further comprises a first thermal insulation sleeve configured to encapsulate the battery.

Optionally, the aerosol generating device further comprises a second thermal insulation sleeve configured to encapsulate the heater sub-assembly.

Optionally, the first thermal sleeve and the second thermal sleeve each have a thermal conductivity of 0.12 W/mK.

Optionally, the first thermal sleeve and the second thermal sleeve each have a wall thickness for the sleeve that is smaller than 10 mm, preferably smaller than 5 mm.

Optionally, the first thermal sleeve and the second thermal sleeve each comprise either one of a blanket with fiber and a solid porous material made of thermal ceramics.

Optionally, the aerosol generating device further comprises an anti-ejection means configured to retain solid components ejected from the battery when the battery runs into a thermal runaway state, the anti-ejection means being arranged between the battery and the housing and comprising a first material having a mechanical strength able to retain the components ejected from the battery.

According to a second aspect of the disclosure, there is provided a housing for an aerosol generating device, the housing comprising a mouth end, an opposing end comprising a vent hole; and a fluid directing arrangement within the housing. The housing is configured to receive a battery within the housing, the battery comprising a vent point in an outer surface of the battery, the vent point arranged such that fluid is released preferentially from the vent point during degassing of the battery. The fluid directing arrangement is configured to define a fluid flow path from the vent point of the battery to the vent hole of the housing.

BRIEF DESCRIPTION OF THE DRAWINGS

FIGS. 3A and 3B schematically illustrate internal features of an aerosol generation device according to a second embodiment;

DETAILED DESCRIPTION

In order to improve safety and reliability, an aerosol generation device may be designed on the basis of accepting the possibility of leaks or degassing from a battery, and designing the aerosol generation device to reduce the risks to the user associated with such events.

A battery used in an aerosol generation device according to the invention comprises a vent point in an outer surface of the battery, arranged such that fluid is released preferentially from the vent point during a degassing or leak event of the battery. The vent point may for example be a weak point or a hole in a casing of the battery.

With a defined vent point, an expected position and direction of degassing from the battery is known, and the aerosol generation device can be designed on the basis of the expected position and direction of degassing. Aerosol generation devices according to the invention comprise a housing in which the battery and a fluid directing arrangement are housed. The fluid directing arrangement is configured to define a fluid flow path from the known vent point of the battery to a vent hole in the housing. With these features, when a battery degassing or leak event occurs, the fluid leaves the battery at the expected position of the vent point, flows along the fluid flow path, and escapes from the aerosol generation device through the vent hole in the housing. By providing this fluid flow path and vent hole, the fluid is less likely to become pressurized within the housing and the risk of an explosion of the aerosol generation device is reduced.

Aerosol generation devices typically have a mouth end at which a generated aerosol is to be provided for a user to consume. This mouth end can be close to the user's face, and therefore it is desirable to direct any risks associated with battery leaks or degassing to be as far as possible from the mouth end. Accordingly, in embodiments of the invention, the fluid directing arrangement is configured to direct the fluid to a vent hole provided at an opposite end of the housing from the mouth end.

Having explained the general concepts of the invention, specific example embodiments will now be described with reference to the figures. It should be understood that some details of the embodiments shown in the figures are not relevant for explaining the preferred features of the invention, and thus, for conciseness, some features shown in the figures are not described in detail, and, for simplicity, some features are omitted entirely in certain figures in order to better illustrate the features relevant for understanding and implementing the invention, even if the omitted features may nevertheless be present in embodiments.

Figure 1A:
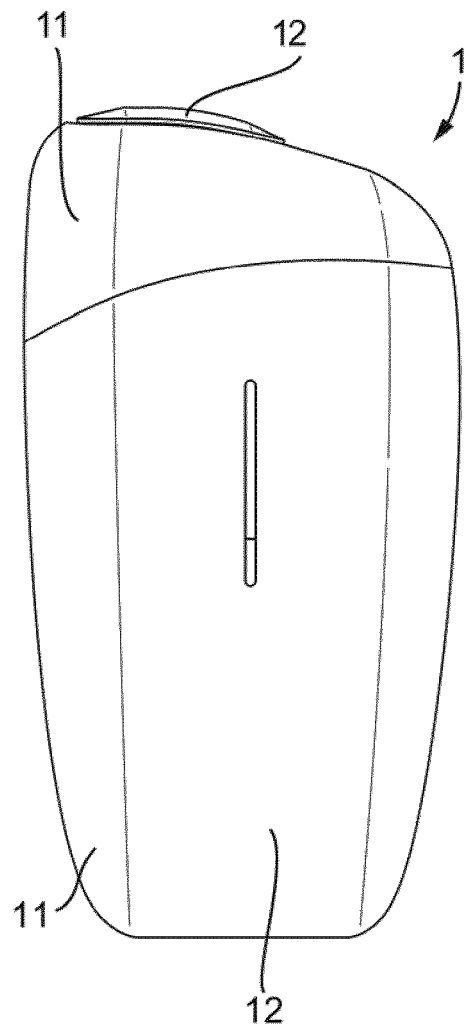
FIGS. 1A and 1B schematically illustrate an aerosol generation device.

FIG. 1A schematically illustrates an aerosol generation device 1 of an embodiment enclosed in a housing 11. As shown in FIG. 1A, the housing of this embodiment comprises an upper part and a lower part. The upper part includes an access means 12 where the generated aerosol is provided. In this embodiment, the access means is a sliding lid, but in other embodiments the access means could be, for example, a fixed mouthpiece or a detachable lid covering an opening. In this embodiment, the access means is configured to receive a disposable mouth piece which is provided as part of a packaged aerosol substrate, such as a cigarette. Thus it will be understood that the upper part of the housing 11 shown in FIG. 1A comprises the mouth end of the housing 11 and the lower part of the housing 11 comprises an opposing end.

The opposing end of the housing 11 may comprise a flat surface such that the aerosol generation device 1 can be supported in an upright position on a surface when resting on the opposing end.

Figure 1B:
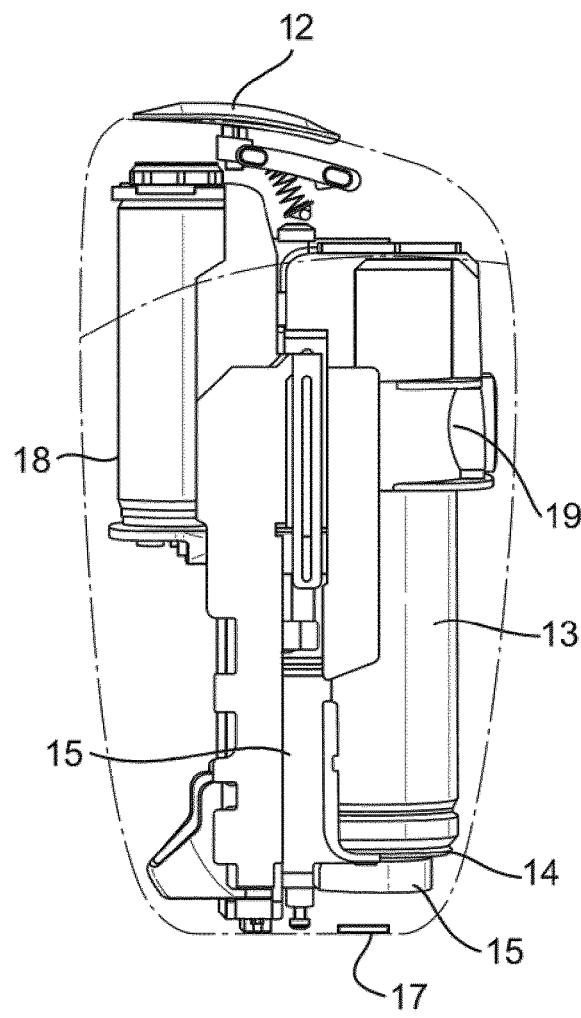

FIG. 1B schematically illustrates internal features of the aerosol generation device 1 shown in FIG. 1A. The housing 11 is made "transparent" in this figure (illustrated using dashed lines) in order to show the internal features. On the right of the figure, a battery 13 is located within the housing, and a vent point 14 in an outer surface of the battery is labelled. In this embodiment, the battery 13 is held by a frame 15 and the frame includes a fluid directing arrangement 16 configured to define a fluid flow path from the vent point 14 to a vent hole 17 in the opposing end of the housing 11.

The frame 15 may be configured as a battery support frame positioned across an internal volume of the housing so as to seal the battery 13 in one portion of the internal volume of the housing. For example, in FIG. 1B the frame 15 is arranged along an elongate direction of the aerosol generation device 1 between the mouth end and opposing end to divide the internal volume of the housing 11 along at least part of its elongate length. The battery 13 is positioned aligned along the elongate direction on one side of the frame 15. The frame 15 may cooperate together with a mounting cap (shown in subsequent figures) in order to define this division of the internal volume. The frame may comprise PA (Polyamide) and/or PEEK (Polyether ether ketone).

As also shown in FIG. 1B, the aerosol generation device 1 of this embodiment also comprises a heater sub-assembly 18. The heater sub-assembly 18 is arranged in communication with the access means 12. The heater sub-assembly comprises a heater and a heating chamber with an opening at the mouth end of the body. The heating chamber is arranged to receive a consumable aerosol substrate to be heated in order to generate an aerosol. The packaged aerosol substrate is input to the heating chamber through the access means 12. The heater sub-assembly 18 also comprises a heater for heating the heating chamber, which may be, for example, a film-type heater wrapped around the heating chamber or a blade-type heater protruding into the heating chamber. In other embodiments, the heating chamber may be replaced by a heating coil in which a liquid aerosol substrate can be heated to generate an aerosol provided at an access means 12 that has a fixed mouthpiece. The heater sub-assembly 18 may also comprise a temperature sensor for regulating a temperature in the heating chamber.

Furthermore, as shown in FIG. 1B, the aerosol generation device 1 of this embodiment comprises a vibrator element 19. The vibrator element is positioned within the housing 11, adjacent to an inner surface of the housing, and arranged to transmit vibrations to the housing. For example, the vibrator element may be configured or controlled to vibrate when the heater is initially turned on, when the heater reaches a predetermined temperature, or after the heater has been on for a predetermined duration. As will be discussed further below, in embodiments having a vibrator element 19, the vibrator element may be provided in a variety of positions including alongside the battery 13 between the mouth end and the opposing end as shown in FIG. 1B, or between the battery 13 and the opposing end of the housing 11.

Figure 2A:
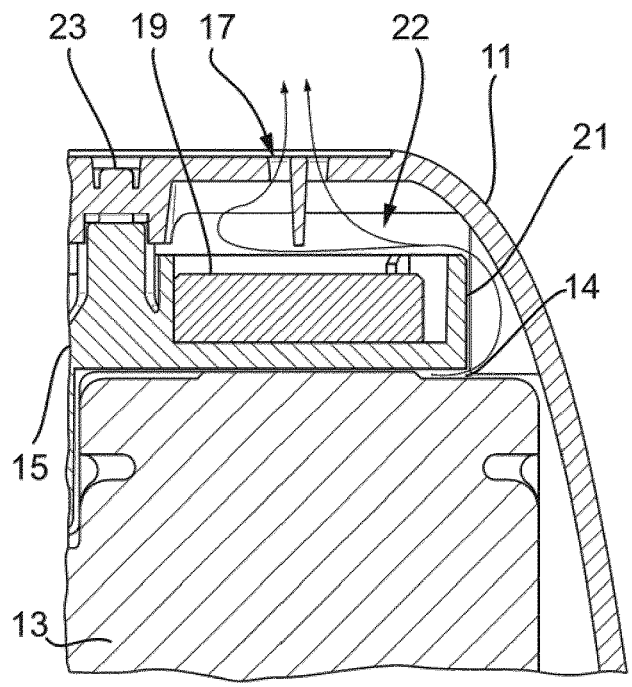
FIGS. 2A, 2B and 2C schematically illustrate fluid flow in an aerosol generation device according to a first embodiment.
Figure 2B:
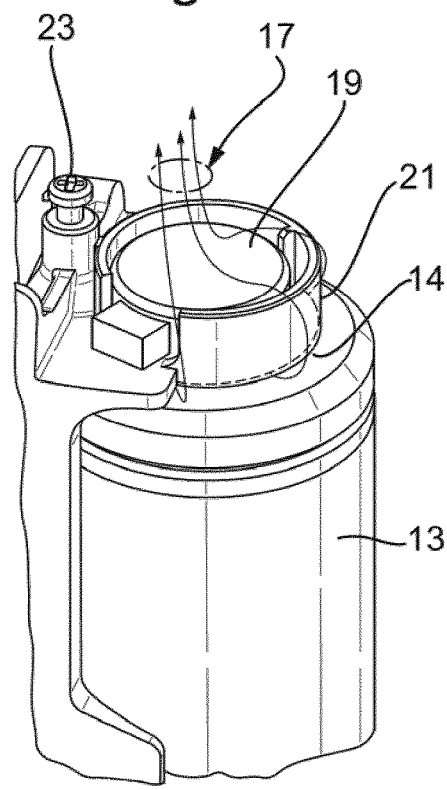
Figure 2C:
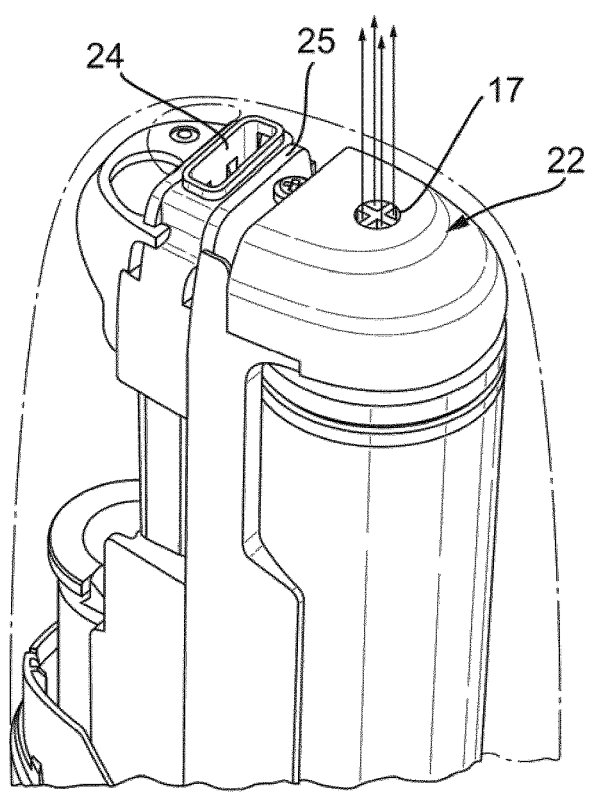

FIGS. 2A, 2B and 2C schematically show a first embodiment where a vibrator element 19 is positioned adjacent to an end of the battery 13.

As schematically indicated in FIG. 2A, the vent point 14 of the battery 13 also positioned on the same end of the battery 13. A vibrator element support 21 is configured to hold the vibrator element 19. In this particular embodiment, the vibrator element 19 has a round flat shape, and the vibrator element support 21 provides a base wall and side wall for an approximately cylindrical volume occupied by the vibrator element 19. The vibrator element support 21 also has a gap in the side wall through which electrical connections to the vibrator element 19 may be formed. The vibrator element support 21 forms part of the fluid directing arrangement 16 configured to direct a fluid flow path around the vibrator element 19 from the battery vent point 14 to the housing vent hole 17.

With this arrangement, the flow of a fluid expelled from the battery 13 during degassing is directed as shown using curved arrows, passing from the battery vent point 14, through a cavity 22 within the housing that is adjacent to the battery vent point 14 and is configured to receive the fluid expelled from the battery during degassing, and then out through the housing vent hole 17.

FIG. 2A also shows a fastener 23 for detachably attaching the frame 15 to the housing 11.

FIG. 2B schematically shows an alternative view of the embodiment of FIG. 2A, where the housing 11 is omitted from the view in order to more easily show internal features. The position of the vent hole 17 of the housing is illustrated using a circle.

FIG. 2C schematically shows a further alternative view of the embodiment of FIG. 2A, where the housing 11 is displayed "transparently" (using dashed lines) in order to illustrate the arrangement of cavity 22. FIG. 2C also shows a fluid flow direction of fluid ejected out through the housing vent hole 17, indicating that the fluid flows directly away from the device 1 out of the opposing end. By directing the fluid flow out of the opposing end, the device 1 reduces the risk of injury to a user because, in normal usage, the user's face would only be expected to be close to the mouth end, and the user's hand would only be expected to be around the sides of the device between the mouth end and the opposing end, and therefore any mechanical force or chemical risk associated with the degassing is directed away from the expected locations of the user.

FIG. 2C also shows an electrical connector 24, which may be a USB connector, provided at the bottom end to form an electrical connection external to the aerosol generation device 1. This electrical connector 24 is for charging the battery 13 and/or for controlling the aerosol generation device 1. The electrical connector 24 is internally connected to control circuitry mounted on a PCB 25. The control circuitry may be used for controlling the heater sub-assembly 18 to heat the heating chamber to a predetermined temperature, and may be powered by the battery 13. The PCB 25 forms part of the enclosure of cavity 22, along with the housing 11 and the vibrator element support 21. In other embodiments, the PCB 25 or the electrical connector 24 may be omitted. For example, the battery 13 may be removable from the aerosol generation device 1 such the battery can be charged externally or replaced, and the aerosol generation device 1 does not need to provide means for charging the battery 13.

The PCB 25 is arranged along the frame 15. The PCB 25 may further comprise a plurality of sections connected by one or more flexible portions.

FIGS. 3A and 3B schematically illustrate a second embodiment that is similar to the first embodiment except where described differently in the following.

Referring to FIG. 3A, in the second embodiment, a vibrator element 19' is provided at a location within the aerosol generation device 1 other than adjacent to the vent point 14 at the end of the battery 13. In particular, in this embodiment, a vibrator element 19' is provided between a side surface of the battery 13 and an adjacent inner surface of the housing 11. The vibrator element 19' is also positioned towards the mouth end along an elongate side of the device. As shown in FIG. 3A, the aerosol generation device 1 may comprise a mounting cap 31 for suspending internal parts of the aerosol generation device within the housing. In this case, the vibrator element 19' may be provided at least partly between the side surface of the battery 13 and the mounting cap 31, as shown in FIG. 3A.

The vibrator element 19' may be connected to the PCB 25 via an end section of the PCB 25 which folds over an end of the battery 13 closer to the mouth end of the aerosol generation device 1.

Furthermore, in the second embodiment, the vibrator element 19 can be removed, such that its function is entirely replaced by vibrator element 19'. FIG. 3B illustrates an embodiment where the vibrator element 19 is removed and an absorbent pad 32 is positioned in its place adjacent to the vent point 14 of the battery 13. The absorbent pad 32 may be provided in the fluid flow path defined by the fluid directing arrangement. More specifically, in the embodiment shown in FIG. 3B, the vibrator element support 21 which directed fluid flow around the vibrator element 19 in FIG. 3A is replaced with an annular support 16 that directs fluid flow through the annular support, from the vent point 14 of the battery 13 to the vent hole 17 in the housing 11, and the absorbent pad 32 is positioned within the annular support such that the fluid flow at least partially passes through the absorbent pad. This arrangement of an annular support 16 has the advantage that fluid can flow more directly between the vent point 14 and the vent hole 17 and therefore the fluid can be expelled more rapidly, reducing the risk of sufficient pressure building within the housing 11 to cause damage to the aerosol generation device 1. The absorbent pad 32 will at least partly absorb and/or slow down fluid flowing along the fluid flow path as a result of a degassing event, thereby reducing the chemical risk associated with fluid vented from the battery 13 and out through the vent hole 17. The absorbent pad may, for example, comprise a porous material such as metal (e.g. aluminium) or plastic.

FIG. 3B also illustrates several points 33, 33' at which the cavity 22 within the housing 11 may be sealed in order to prevent fluid flow towards the mouth end. This sealing may be achieved by providing an additional frame component adapted to fit snugly between the battery 13 and the housing 11 such that, even if internal parts are suspended by the mounting cap 31 within the housing 11, fluid cannot flow from the vent point 14 and around the length of the side of the battery 13 to reach the mouth end of the aerosol generation device 1.

Figure 4A:
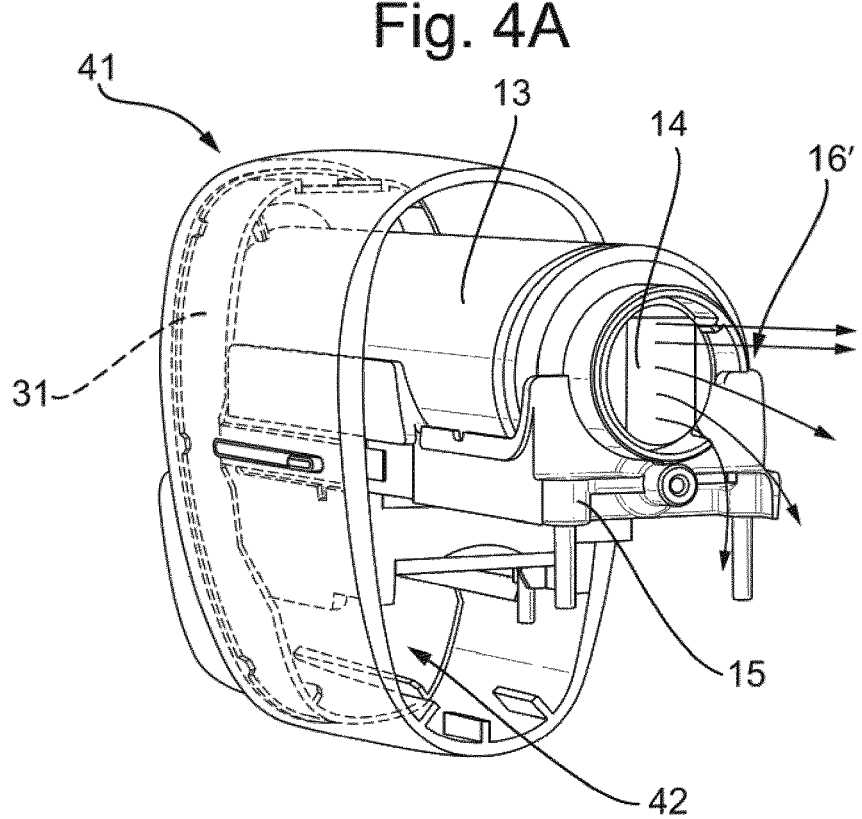
FIGS. 4A and 4B schematically illustrate features of aerosol generation devices according to further embodiments.
Figure 4B:
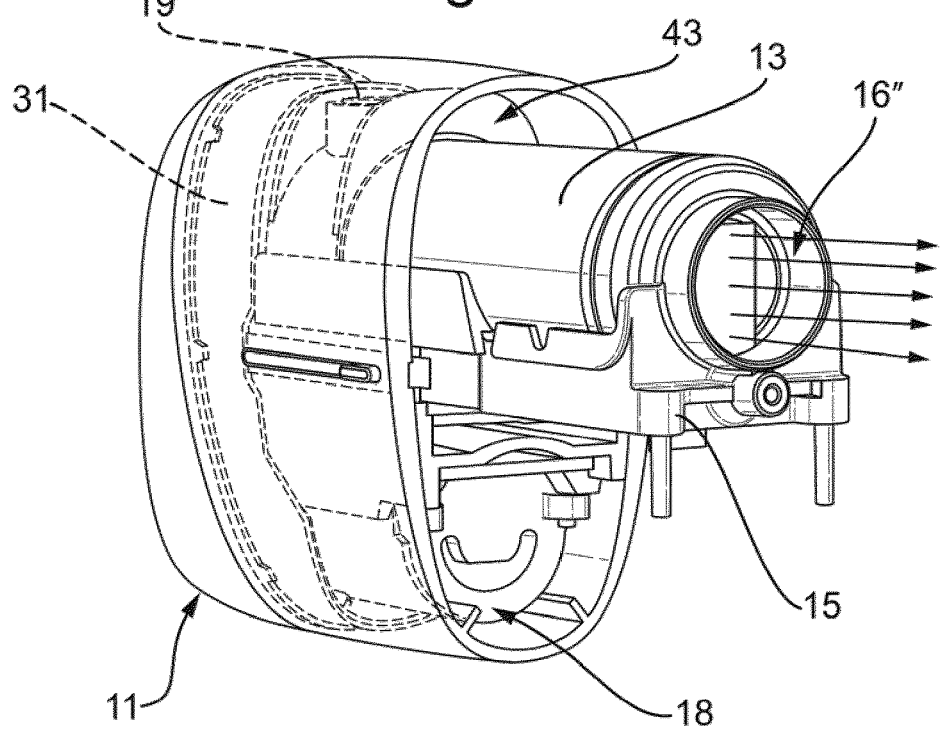

Turning to FIGS. 4A and 4B, there are schematically illustrated further embodiments with alternative shapes for the annular support 16.

In FIG. 4A, the annular support 16' comprises a complete ring at an end adjacent to the battery 13 and the vent point 14, and the annular support 16' extends away from the battery 13 to partially enclose an approximately cylindrical volume. The annular support 16' has a gap in its wall. As illustrated with arrows in FIG. 4A, this gap allows fluid to flow away from the most direct path between the vent point 14 and the vent hole 17, but the annular support 16' has the advantage that it can be constructed from a vibrator element support 21 of the first embodiment as shown in FIG. 2B, by removing the base wall of the vibrator element support 21. For example, the base wall may be removed by drilling through the frame material. In this embodiment, a hole in the housing 11 for the electrical connector 24 may act as a secondary vent hole.

On the other hand, in FIG. 4B, the annular support 16" does not have a gap in its wall, which completely surrounds an approximately cylindrical volume. As illustrated with arrows in FIG. 4B, compared to annular support 16', annular support 16" is more effective at directing fluid flow from the vent point 14 towards the vent hole 17. This decreases the chance of damage to the aerosol generation device 1 as a result of a fast or large degassing event.

Although omitted from FIGS. 4A and 4B, annular supports 16' and 16" optionally support an absorbent pad 32 as described above.

A comparison between FIGS. 4A and 4B also illustrates some features of the housing 11 according to the example embodiments shown in the Figures. In particular, as shown in FIG. 4A, there is a gap 41 between the mounting cap 31 and the housing 11. This gap is provided to receive a snap-fit attachment means of an access sub-assembly including the upper part of the housing 11 shown in FIG. 1A. Additionally, the housing 11 and frame 15 provide a space 42 where the heater sub-assembly 18 is to be held, such that the heater sub-assembly 18, the frame 15 and the battery 13 all extend along an elongate direction of the aerosol generation device 1.

Additionally, as shown in FIG. 4B, even when arranged in an alternative position provided between a side surface of the battery 13 and an adjacent inner surface of the housing 11, the vibrator element 19' may be provided with a vibrator element support 43. In the embodiment of FIG. 4B, the vibrator element support 43 can act as a sealing point 33' for sealing an end of the cavity 22 in order to prevent fluid flow towards the mouth end. In this case, the vibrator element support 43 conforms to the shape of the battery 13. The vibrator element support 43 can also function as a baffle positioned between a side surface of the battery 13 and an adjacent inner surface of the housing 11 to seal the space of cavity 22 between the battery 13 and the housing 11 and restrict fluid flow towards the mouth end of the housing 11. In order to reduce the transfer of vibration from the vibrator element 19' to the battery 13, and thereby reduce the risk that the vibration could stimulate a degassing or leak event, the vibrator element 19' may be mounted in a rubber gasket.

In embodiments having vibrator element 19 at the end of the battery 13 rather than vibrator element 19' at the side of the battery 13, a baffle 43 may be nevertheless provided with a similar configuration to the vibrator element support 43 described above.

FIGS. 5A to 5E illustrate alternative absorbent pads 32', 33" which may be used in the second embodiment.

Figure 5A:
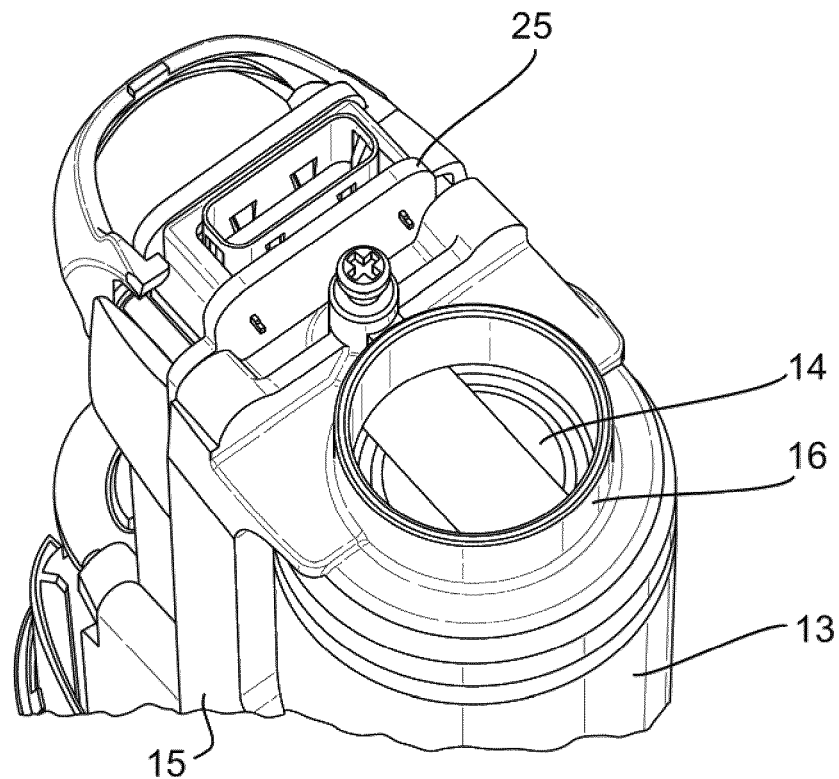
FIGS. 5A to 5E schematically illustrate features of aerosol generation devices according to further embodiments.

FIG. 5A schematically illustrates an alternative view of a frame 15 having an annular support 16 (which may be, for example, be either of the annular supports 16' and 16" shown in FIGS. 4A and 4B) positioned adjacent to the vent point 14 of the battery 13.

As can also be seen in FIG. 5A, in this embodiment, a portion of PCB 25 extends to form a part of the bounding walls of cavity 22. This portion of PCB 25 may be a non-functional dummy PCB portion provided as a wall to protect the electrical connector 24 and/or other control circuitry from chemical effects associated with degassing or leaks from the battery 13.

Figure 5B:
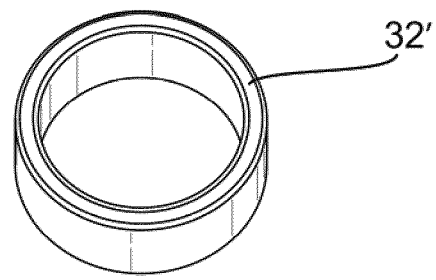

FIG. 5B schematically illustrates an absorbent pad 32' that is configured to fit around a perimeter of the approximately cylindrical volume, but has an annular shape that provides an uninhibited fluid flow path in its centre.

Figure 5C:
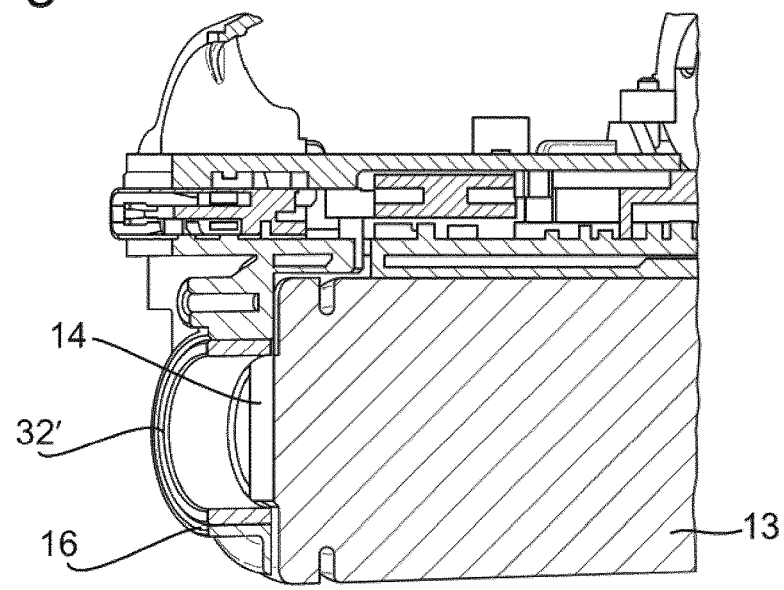

FIG. 5C schematically illustrates a cross section of the absorbent pad 32' positioned within the annular support 16 of FIG. 5A. This illustrates how the annular support 16 together with the absorbent pad 32' define a fluid flow path from the vent point 14, where the fluid may flow through the absorbent pad 32' (and be at least partly absorbed by the absorbent pad 32') and may also flow through the uninhibited region in the centre of the absorbent pad 32'.

Figure 5D:
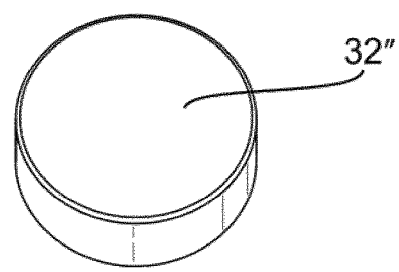

FIG. 5D schematically illustrates an absorbent pad 32" that is configured to fit in and fill an approximately cylindrical volume, such that there is no uninhibited fluid flow path from the vent point 14 to the vent hole 17, and fluid produced by a degassing or leak event at the vent point 14 of the battery 13 must pass through the absorbent pad 32" before it can pass out of the aerosol generation device 1.

Figure 5E:
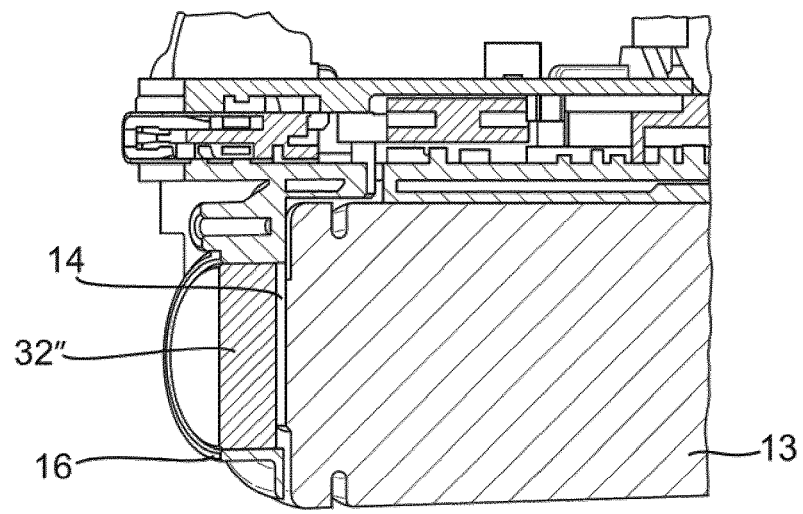

FIG. 5E schematically illustrates a cross section of the absorbent pad 32" positioned within the annular support 16 of FIG. 5A. This illustrates how the absorbent pad 32" extends across the internal cross section of the annular support 16.

Comparing the absorbent pad 32' and the absorbent pad 32", the absorbent pad 32' may support a higher fluid flow rate of fluid produced from the vent point 14, but the absorbent pad 32" may be more effective at damping the effect of a short or small degassing or leak event and may be more effective at protecting against chemical risks associated with a degassing or leak event.

Figure 6A:
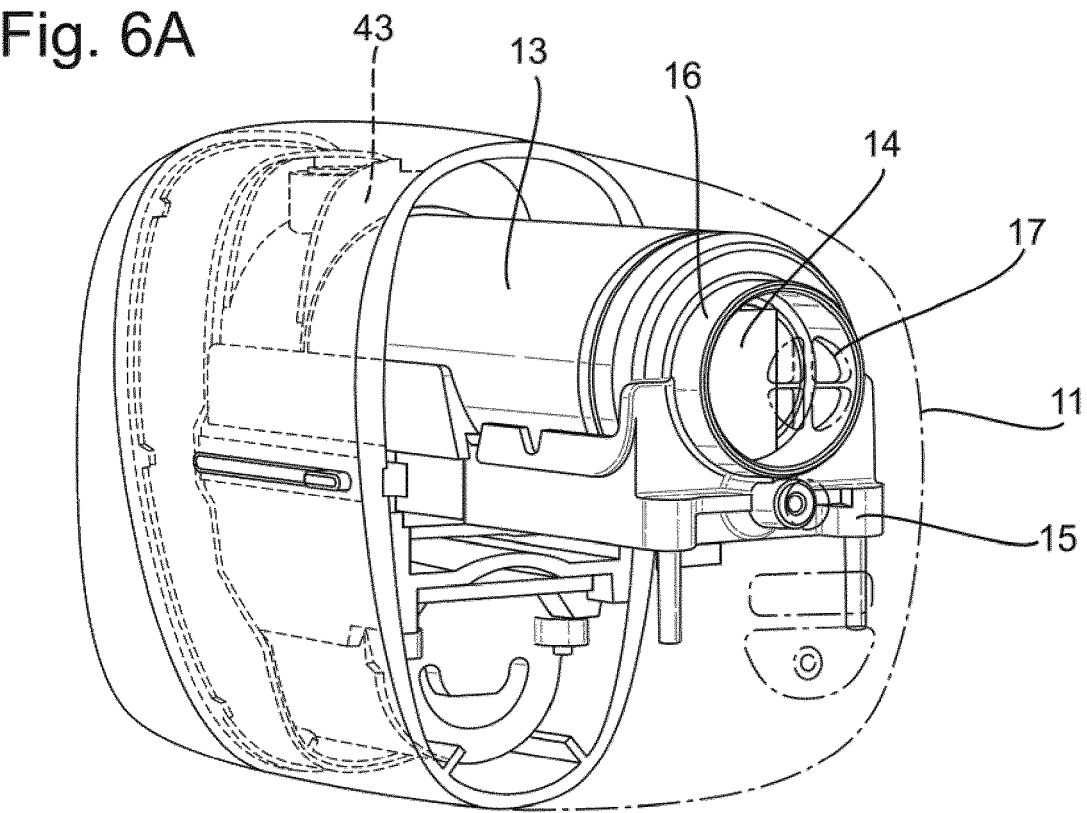
FIGS. 6A and 6B schematically illustrate features of aerosol generation devices according to further embodiments.
Figure 6B:
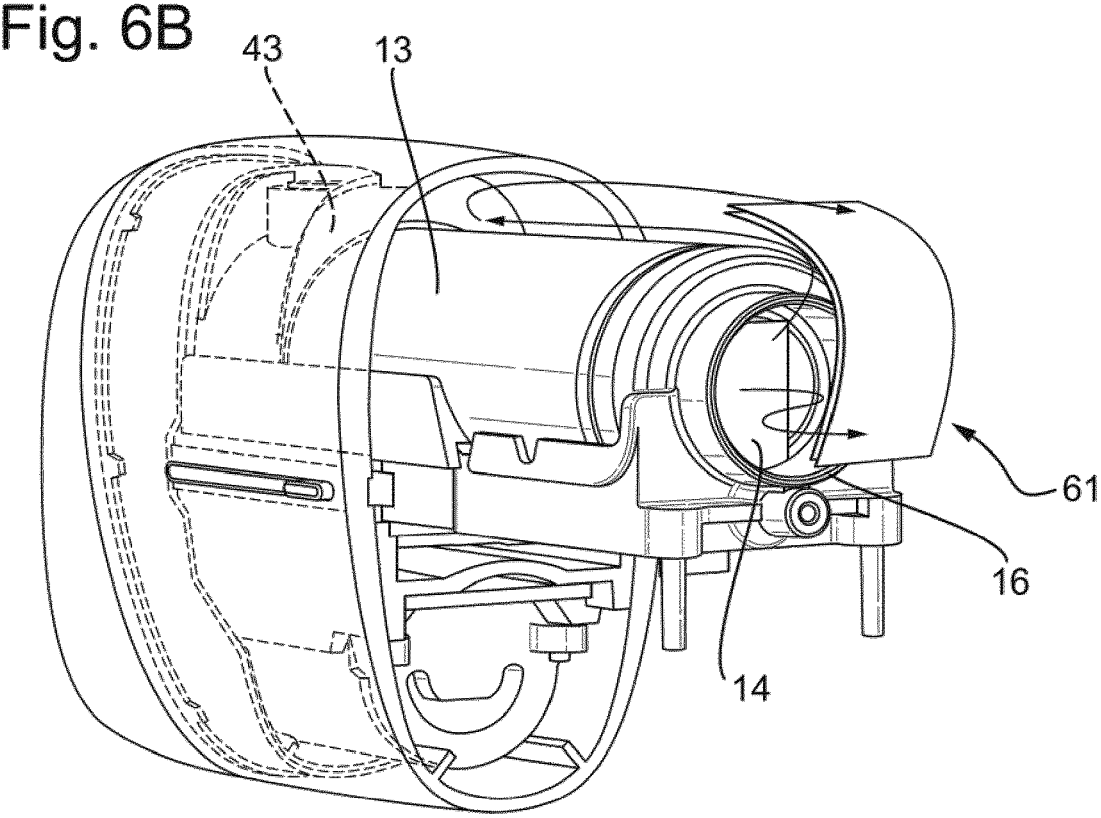

Referring now to FIGS. 6A and 6B, these Figures illustrate alternative views of further aspects of the fluid directing arrangement in embodiments of the invention.

FIG. 6A schematically illustrates the cavity 22 between the vent point 14 of the battery 13 and the vent hole 17 in one embodiment. The housing 11 and vent hole 17 in this Figure are made "transparent" as shown using dashed lines, in order to illustrate internal features. In this embodiment, the cavity 22 is bounded by the housing 11, the surface of the battery 13, the frame 15, and the vibrator element support 43. The annular support 16 also bounds the cavity 22 with both of its inner and outer surfaces. With this arrangement, the annular support 16 acts as a fluid directing arrangement that directs a fluid flow towards the vent hole 17, but the remainder of the cavity 22 is available to receive fluid expelled from the battery during degassing, in the event that fluid is expelled from the battery 13 faster than it can be expelled through the vent hole 17.

The vent hole 17 in this embodiment is an approximately circular hole that is reinforced across its centre with two crossed supporting elements. These supporting elements are arranged across the vent hole to prevent opposing edges of the vent hole from closing. The supporting elements assist the vent hole 17 in retaining its shape and resisting deformation, for example in the case that the housing 11 experiences an external impact. This further helps to ensure that the vent hole 17 remains available for releasing degassing or leak events such that the aerosol generation device 1 continues to meet safety requirements against the effects of degassing or leak events as discussed above. In other embodiments, the supporting elements could be omitted or could be replaced with a single supporting element across the vent hole in a direction that is at greater risk of deformation due to external impact.

In this embodiment, the vibrator element support 43 acting as a baffle optionally comprises a concave surface facing the cavity 22 and directed towards the vent hole 17 in the housing 11. The concave surface may extend between the battery 13 and an adjacent inner surface of the housing 11 so as to seal the gap between the outer surface of the battery 13 and the adjacent inner surface of the housing 11. With such a concave surface, when fluid flows towards the vibrator element support 43 in the cavity 22, the vibrator element support 43 will act as a reflector and will redirect the fluid in the opposing direction towards the vent hole 17. This concave configuration can smooth the reflection, decreasing the maximum force applied on the vibrator element support 43 by fluid produced in a degassing event, and can decrease the maximum pressure of the fluid as it is reflected by the vibrator element support 43, thereby decreasing the chance of damage to the aerosol generation device 1, especially in the case where a fluid produced by degassing is potentially explosive at high pressures.

FIG. 6B schematically illustrates fluid flow in a further embodiment. In FIG. 6B, the housing 11 is hidden so that the fluid flow can be more easily seen.

More particularly, in the embodiment of FIG. 6B, the aerosol generation device 1 comprises one or more deflector planes 61 positioned adjacent to the vent point 14. As shown using arrows, the deflector planes 61 are configured such that, when fluid flows from the vent point 14 toward the vent hole 17, the deflector planes 61 redirect the fluid away from the vent hole 17 and towards the vibrator element support 43 (the baffle). This arrangement increases the distance travelled by the fluid before reaching the vent hole 17, and can therefore reduce the velocity of the fluid when it passes through the vent hole 17. Additionally, the deflector plane(s) may be flexible in order to help to dissipate the energy of the fluid vented from the vent point 14. The deflector plane(s) may for example be made of a resilient metal sheet. As additionally shown in FIG. 6B, the fluid may not be entirely redirected towards the vibrator element support 43, and some of the fluid may still flow more directly towards the vent hole 17.

The deflector plane(s) 61 may be combined with the concave configuration of the vibrator element support 43 described above for FIG. 6A in order to further reduce the mechanical force felt by a user holding the aerosol generation device 1 during a degassing event. The deflector plane(s) 61 may also be combined with the annular support 16 in order to more precisely define a fluid flow path from the vent point to the vent hole. The deflector plane(s) 61, the vibrator element support 43, the annular support 16, the housing 11, the battery 13, the frame 15 and the PCB 25 may all form part of the fluid directing arrangement defining the fluid flow path.

As with FIGS. 4A and 4B, the embodiments shown in FIGS. 6A and 6B may additionally comprise an absorbent pad in the annular support 16.

As a further alternative to the fluid directing arrangements and cavities described for FIGS. 6A and 6B, the annular support 16 may instead be configured to extend up to, and fit flush against, the housing 11, such that the cavity 22 is entirely defined within the annular support 16, between the vent point 14 and the vent hole 17.

Figure 7:
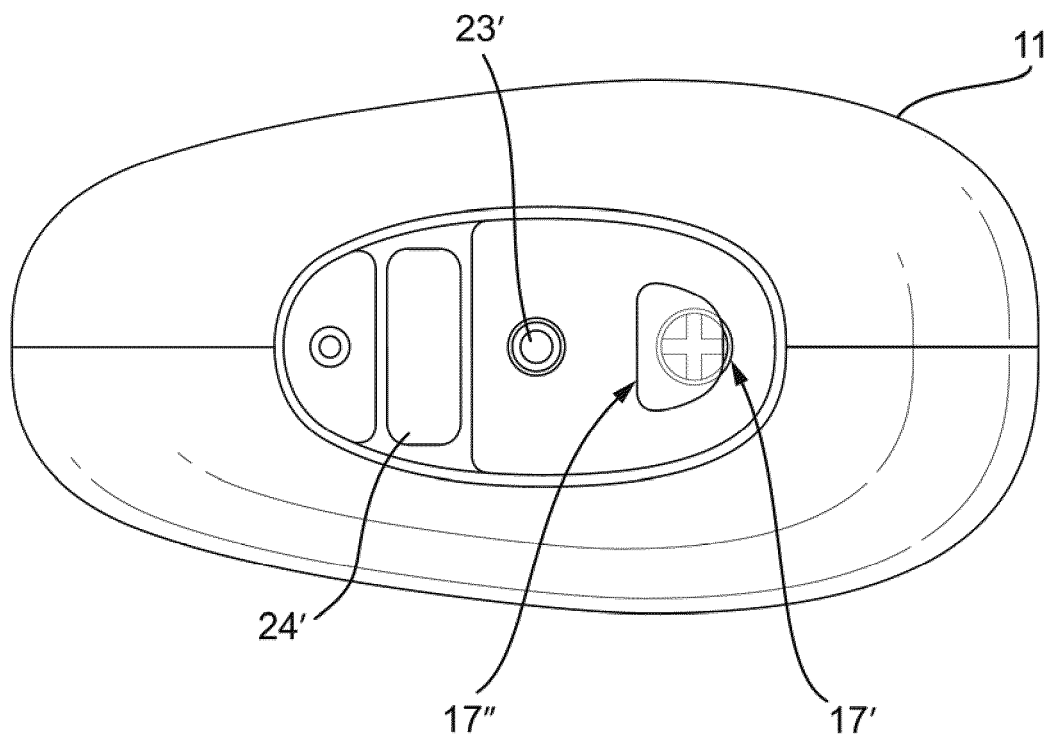
FIG. 7 schematically illustrates an opposing end of a housing of an aerosol generation device according to embodiments.

Referring now to FIG. 7, the housing 11 is illustrated from an exterior view of the opposing end in an embodiment.

In FIG. 7, alternative shapes 17' and 17" are illustrated for the vent hole 17. The vent hole 17 for a typical aerosol generation device 1 has a preferred size of 20 mm² in order to allow fluid produced by a degassing event or leak to be expelled as fast as it is produced and thereby avoid increasing pressure inside the housing 11. Such a preferred size vent hole is labelled 17". However, in cases where it is necessary to provide a smaller vent hole such as labelled 17', the previously described support elements of the vent hole 17 can, in addition to preventing opposing edges of the vent hole 17 from closing, help to prevent the edges of the vent hole 17' from being pushed outwards by the force of a degassing event.

FIG. 7 also illustrates further features of the opposing end. In particular, the opposing end of the housing 11 comprises a hole 23' adapted to receive and be held by the fastener 23, such that the housing 11 is attached to the frame 15. The hole 23' may be surrounded by a recessed portion of the external surface of the housing 11, such that, when the fastener 23 is in place, the fastener 23 is flush with, or below, the external surface.

The opposing end of the housing 11 also comprises a hole 24' for providing access to the electrical connector 24. The electrical connector 24 may extend out of the aerosol generation device 1 through the hole 24' or may be provided within the housing 11 such that a corresponding external connector can be connected. Alternatively, the electrical connector 24 may comprise flat contacts which, while forming an electrical connection, do not form a mechanical connection.

Yet further, the electrical connector 24 may be replaced with a magnetic connector such as an inductive power transfer element. In such an embodiment, the hole 24' may be omitted.

Figure 8A:
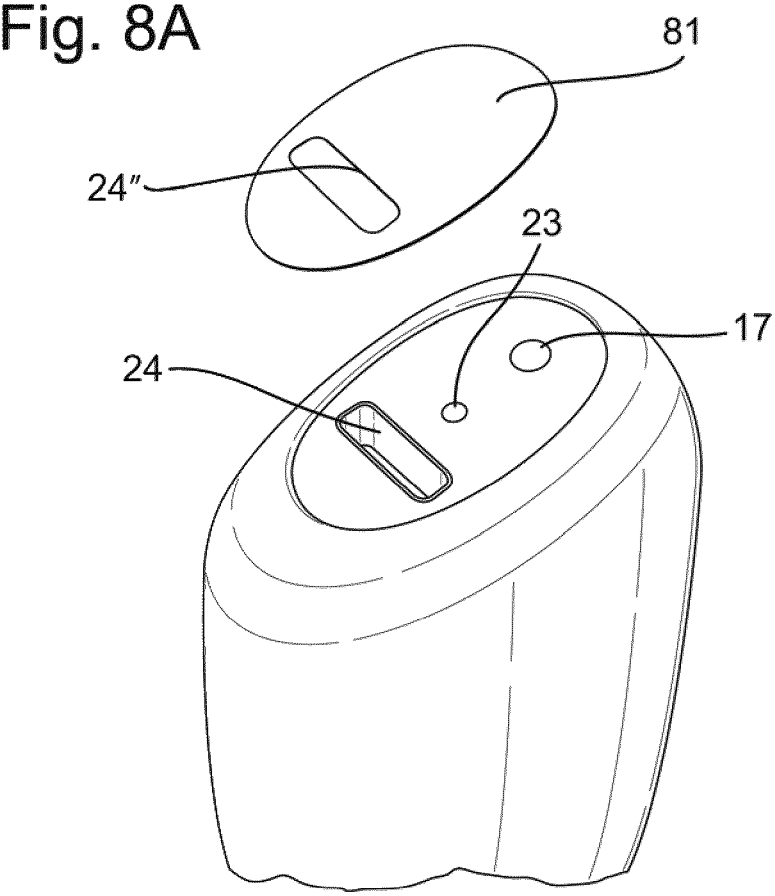
FIG. 8 schematically illustrates a sticker and an opposing end of a housing of an aerosol generation device according to an embodiment.
Figure 8B:
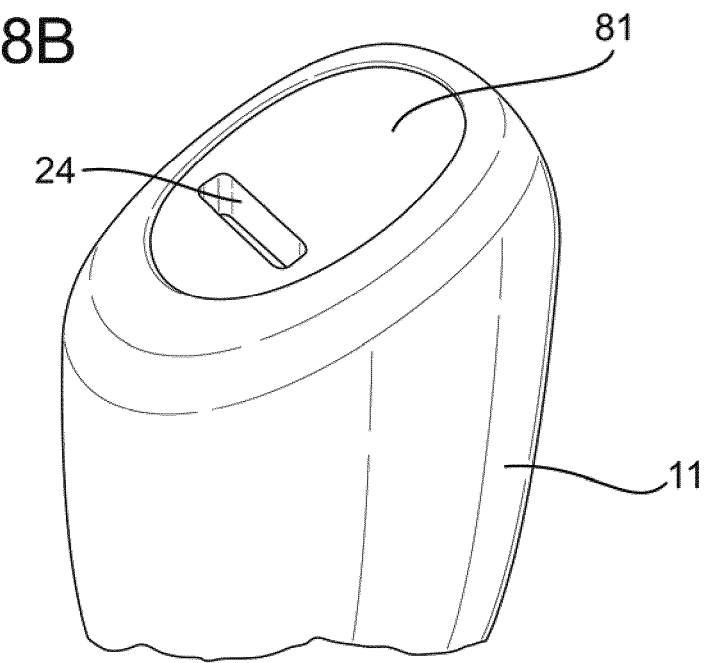

Turning to FIGS. 8A and 8B, these Figures illustrate the feature of a sticker on the opposing end.

Referring to FIG. 8A, the sticker 8A is shown prior to being attached to the opposing end on an outer surface of the housing 11. In this embodiment, the sticker 8A is adapted to fit a recess in the opposing end of the housing 11, where the recess includes the vent hole 17, the hole 23' for the fastener 23 and the hole 24' for the electrical connector 24. The sticker 81 has a corresponding hole 24" for the electrical connector 24. The sticker 81 may also include product information as a convenient way of providing such information on the housing 11.

Referring to FIG. 8B, when the sticker is attached to the opposing end, the sticker 81 is positioned such that holes 24' and 24" align and the electrical connector 24 is accessible. On the other hand, the sticker 81 is positioned over the vent hole 17 and the hole 23' for the fastener 23. Covering the fastener 23 in this way improves safety by making it harder for the uneducated consumer to access the interior of the aerosol generation device 1. Covering the vent hole 17 in this way also improves safety by protecting and hiding access to the battery 13. However, the sticker 81 is attached weakly such that, when internal pressure is applied during a degassing event of the battery 13, the sticker 81 will detach and be displaced to uncover the vent hole 17 and allow fluid to escape from the aerosol generation device 1. Alternatively, the sticker 81 may be configured to be sufficiently weak in an area aligned with the vent hole that, when internal pressure is applied during a degassing event of the battery 13, the sticker 81 in the area covering the vent hole 17 will break and be displaced to uncover the vent hole 17 and allow fluid to escape from the aerosol generation device 1.

Another problem addressed by the present specification is a heating dissipation from the heater sub-assembly 18 to the battery 13, which potentially raises up the temperature of the battery further and in addition to a self-heating process, and increases the risk of a degassing event. This is specific to non-rod shaped devices, because in a rod-like device the facing surface between the battery and the heating oven is comparatively small as it is being limited by a cross-section of the rod casing, and generally corresponds to an end surface of a cylinder (shape of the heating oven and the battery). Further, in the rod-like device, the heating oven and the battery can be arranged spaced apart on the two opposite ends of the rod.

Figure 10:
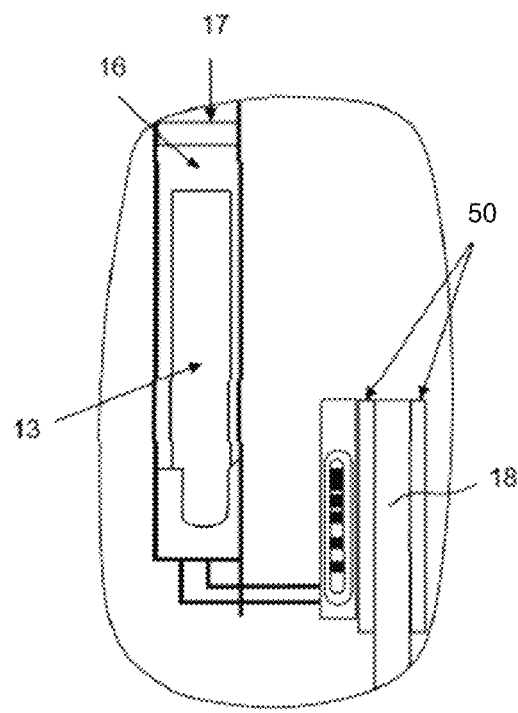
FIG. 10 schematically illustrates an example embodiment comprising a thermal insulating sleeve around the heater sub-assembly.
Figure 9:
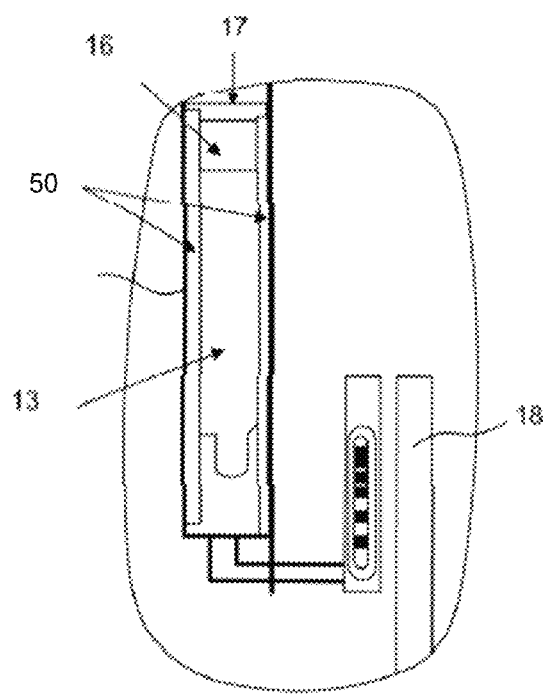
FIG. 9 schematically illustrates an example embodiment comprising a thermal insulating sleeve around the battery.

Referring to both FIGS. 9 and 10, these both schematically illustrate example embodiments of the aerosol generating device with solutions to overcome the problem of heating dissipation from the heater sub-assembly 18.

In these figures, the aerosol generating device is a pebble-like device, in which the heater sub-assembly 18 and battery 13 have to be arranged relatively close to each other, and face each other with a relatively large area due to being arranged partly in parallel, although not in direct contact. Thus heat from the heater sub-assembly 18 can dissipate to the battery 13 more easily than in a rod-like device where the battery and heater sub-assembly are arranged end-to-end. Hence a solution of thermal insulation around the battery 13 or the heater sub-assembly 18 is provided.

In FIG. 9, the proposed solution is to encapsulate the battery 13 with a thermal insulation sleeve 50. The thermal insulation sleeve is for example characterized by:

a very low thermal conductivity of 0.12 W/mK;
a wall thickness for the sleeve in the range between 5 mm and 10 mm;
a low volumic mass; and
optionally, a phase change protection.

The thermal insulation sleeve 50 may comprise a blanket (with fibers) or a solid porous material made of thermal ceramics. In the present embodiment, the thermal insulation sleeve 50 is disposed along an inner surface of the battery compartment, and a sealing piece is disposed between the thermal insulation sleeve and battery to seal or block gap and thus prevent pressurized gases or liquid to flow to PCBA as described previously. In an alternative embodiment, the thermal insulation may also be disposed along an outer surface of the battery compartment.

FIG. 10 shows an alternative solution where the thermal insulation sleeve 50 is placed around the heater sub-assembly 18. In another embodiment, the device can have both an insulation sleeve to encapsulate the battery 13 and an insulation sleeve to encapsulate the heater sub-assembly 18.

Figure 11:
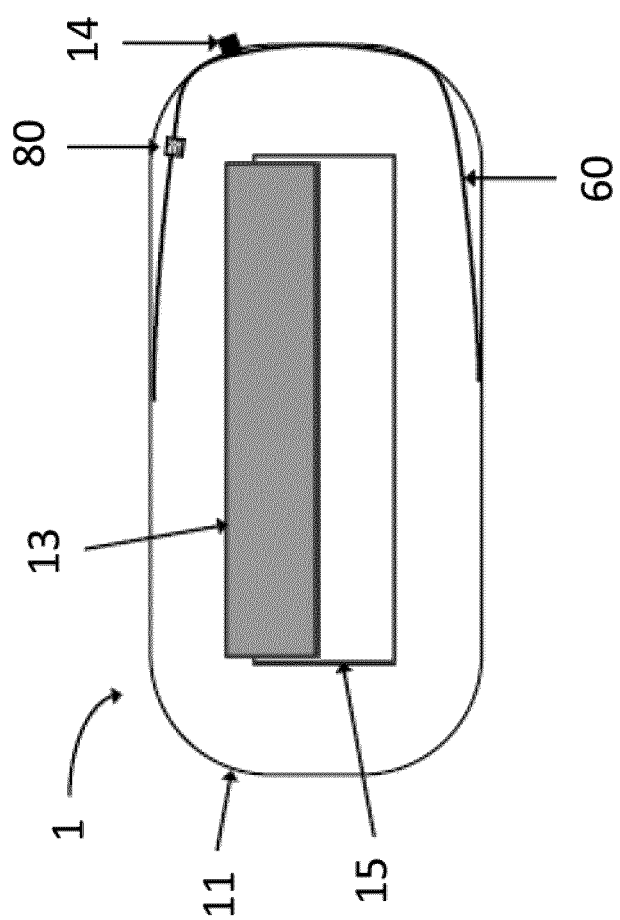
FIG. 11 schematically illustrates an example embodiment comprising an anti-ejection means configured to retain solid components.

FIG. 11 schematically illustrates an example embodiment comprising an anti-ejection means 60 configured to retain components ejected from the battery 13 when the battery 13 runs into a thermal runaway state, the anti-ejection means 60 being arranged between the battery 13 and the housing 11 and comprising a first material having a mechanical strength able to retain the components ejected from the battery. The anti-ejection means 60 in this embodiment may also function as a fluid directing arrangement as described above.

When the battery 13 runs into the thermal runaway, direct ejection of battery components (not shown in FIG. 11) may happen. Components are ejected in a straight line from their point of ejection with an energy linked in particular with the pressure building-up inside the battery, when the latter runs into a thermal runaway and vents gases. Ejected components will strike the anti-ejection means 60, the latter acting therefore as a shield or a fence. Ejected components will then either becoming snared in the anti-ejection means 60 or lose a significant part of their momentum such that they no longer be dangerous or harmful for the user.

The first material may be configured to retain components ejected from the battery 13, when the battery 13 has an internal pressure for example between 1000 KPa (10 bars) to 3000 KPa (30 bars), with a preferred internal pressure of 2500 KPa (25 bars).

The mechanical strength of the first material may vary depending of the battery properties, the housing of the device or several device component properties.

The first material may comprise metallic material, aluminum, stainless steel or any suitable material having a mechanical strength able to retain the components ejected from the battery 13.

The first material may also comprise plastic material or Polypropylene PP.

The first material may also comprise porous material such a metallic or plastic foam for example.

The anti-ejection means 60 may comprise a ribbon or a ring or an elongated plate. It may comprise, for example, one or several of the previously mentioned structures, either separated or joined together as a single piece.

The elongated plate may cover between 50% to 80% of a face (diameter in case of cylindrical cell) of the battery 50.

The anti-ejection means 60 may also comprise a net, a mesh or a highly porous material such as foam for example in order to let the gases vent through it while preventing direct ejection of ejected components coming from the battery 13. The net, the mesh or the highly porous material such as foam may comprise metallic, plastic or any suitable material having a sufficient mechanical strength able to retain the components ejected from the battery. When the anti-ejection means comprise such material, pressurized gases may be vented through the anti-ejection means and/or around the anti-ejection means.

Foam comprised in the anti-ejection means 60 may be for example metallic foam comprising inner cavities forming an inner volume through which gases can be vented.

The anti-ejection means 60 may have a U-shaped conformation as depicted in FIG. 11.

The anti-ejection means 60 may extend over a part of the battery 13, over the full length of the battery 13 or over one extremity or one corner of the battery 13.

The anti-ejection means 60 may also extend as an elongated plate or ribbon on at least one side of the battery 13.

The anti-ejection means 60 may alternatively extend as a cylindrical or parallelepipedal case over at least a part of the battery 13 or over all the surface of the battery.

In one embodiment, the housing 11 further comprises at least one anchor point allowing to attach and secure the anti-ejection means 60 to the housing 11. The at least one anchor point is arranged in the inner space of the housing 11 and may comprise for example a ring, a protrusion or a recess around or in which the anti-ejection means 60 extends and is secured for example by a bent section of the anti-ejection means 60 or by gluing, thermal sealing, form-fit or any suitable method.

In yet another embodiment, the at least one anchor point is arranged on a device frame, on the device structure, on the battery or at any suitable location of the device.

As depicted in FIG. 11, anti-ejection means 60 may further comprise at least one opening 80 configured to vent pressurized gases released by the battery 13 from within the anti-ejection means 60.

The at least one opening 80 may be arranged at any suitable location along the anti-ejection means 60, for example on the middle, on the extremities or between these two locations on the anti-ejection means 60.

The at least one opening 80 has a size which is smaller than a size of the components potentially ejected from the battery 13 when the battery runs into the thermal runaway state but large enough to allow gas venting.

The at least one opening 80 may be circular or rectangular or of any different suitable geometry.

A surface of the at least one opening 80 may be comprised for example between 10 $mm^2$ to 120 $mm^2$, with a preferred surface of 30 $mm^2$.

The surface of the at least one opening 80 may depend on the type, the size, the capacity or the chemistry of the battery 13.

In another embodiment, the least one opening 80 may comprise a combination of several smaller openings arranged on the anti-ejection means 60.

The total surface of the combination of the several smaller openings arranged on the anti-ejection means 60 may be comprised between 10 $mm^2$ to 120 $mm^2$, with a preferred total surface of 30 $mm^2$.

The surface or total surface of the at least one opening 80 may vary depending of the battery properties, the casing of the device or several device component properties.

The at least one opening 80 may be configured to vent pressurized gases from within the anti-ejection means 60 upon a predetermined gas pressure.

The at least one opening 80 may comprise a soft sleeve arranged on the opening 80, the soft sleeve comprising for example silicon rubber or thin aluminum foil that deforms upon a predetermined gas pressure.

The at least one opening 80 arranged on the anti-ejection means 60 and the vent hole 17 arranged on the housing 11 may be arranged to face each other to facilitate gas venting outside the aerosol generating device 1 through the anti-ejection means 60 and the housing 11.

The at least one opening 80 arranged on the anti-ejection means 60 and the vent point 14 of the battery 13 may be arranged to face each other to facilitate gas venting.

Definitions and Alternative Embodiments

It will be appreciated from the description above that many features of the described embodiment perform independent functions with independent benefits. Therefore the inclusion or omission of each of these independent features from embodiments of the invention defined in the claims can be independently chosen.

In the figures, the vibrator element support 21, and the annular supports 16, 16', 16" define an approximately cylindrical volume with a circular cross-section, and the absorbent pads 32, 32', 32" are adapted with a similar circular cross-section. However, this need not be the case, and these features may instead have an elliptical, polygonal, or irregular cross-section. Furthermore, instead of having solely an annular shape, the absorbent pad 32' may have additional internal structure to increase the surface area of the absorbent pad while also maximising the total uninhibited cross-section area of the fluid flow path between the vent point 14 and the vent hole 17.

Where the absorbent pad is configured to provide an uninhibited path through the annular support, this need not be in the centre of the absorbent pad. For example an outside cross section of the absorbent pad may not be conformed with an internal cross section of the annular support, and may be configured to provide a gap between an outer surface of the absorbent pad and an inner surface of the annular support. For example, the absorbent pad could be a square pad and the annular support could have a circular cross-section, such that only the corners of the absorbent pad contact the annular support.

The absorbent pad 32, where present, may be attached to the frame 15 using, for example, an adhesive or a structural retaining element such as a ridge which may be at an end of the annular support 16. The absorbent pad 32 may be permanently attached or may be separable such that the absorbent pad 32 can be replaced as and when it reaches a limit of its ability to absorb fluid vented from the battery.

In the above-described embodiments having an annular support, an absorbent pad is optionally provided within the annular support. In other embodiments, an absorbent pad may instead be provided elsewhere in the cavity 22 or may be provided across the vent hole 17 in the housing 11. The absorbent pad may, in one example, be provided to fill the cavity 22.

The term "heater" should be understood to mean any device for outputting thermal energy sufficient to form an aerosol from the aerosol substrate. The transfer of heat energy from the heater to the aerosol substrate may be conductive, convective, radiative or any combination of these means. As non-limiting examples, conductive heaters may directly contact and press the aerosol substrate, or they may contact a separate component such as the heating chamber which itself causes heating of the aerosol substrate by conduction, convection, and/or radiation.

Heaters may be electrically powered, powered by combustion, or by any other suitable means. Electrically powered heaters may include resistive track elements (optionally including insulating packaging), induction heating systems (e.g. including an electromagnet and high frequency oscillator), etc. The heater may be arranged around the outside of the aerosol substrate, it may penetrate part way or fully into the aerosol substrate, or any combination of these. For example, instead of the heater of the above-described embodiment, an aerosol generation device may have a blade-type heater that extends into an aerosol substrate in the heating chamber.

The term "temperature sensor" is used to describe an element which is capable of determining an absolute or relative temperature of a part of the aerosol generation device 1. This can include thermocouples, thermopiles, thermistors and the like. The temperature sensor may be provided as part of another component, or it may be a separate component. In some examples, more than one temperature sensor may be provided, for example to monitor heating of different parts of the aerosol generation device 1, e.g. to determine thermal profiles. Alternatively, in some examples, no temperature sensor is included; for example, this would be possible where thermal profiles have already been reliably established and a temperature can be assumed based on operation of the heater.

Aerosol substrate includes tobacco, for example in dried or cured form, in some cases with additional ingredients for flavouring or producing a smoother or otherwise more pleasurable experience. In some examples, the aerosol substrate such as tobacco may be treated with a vaporising agent. The vaporising agent may improve the generation of vapour from the aerosol substrate. The vaporising agent may include, for example, a polyol such as glycerol, or a glycol such as propylene glycol. In some cases, the aerosol substrate may contain no tobacco, or even no nicotine, but instead may contain naturally or artificially derived ingredients for flavouring, volatilisation, improving smoothness, and/or providing other pleasurable effects. The aerosol substrate may be provided as a solid or paste type material in shredded, pelletised, powdered, granulated, strip or sheet form, optionally a combination of these. Equally, the aerosol substrate may be a liquid or gel. Indeed, some examples may include both solid and liquid/gel parts.

Consequently, the aerosol generation device 1 could equally be referred to as a "heated tobacco device", a "heat-not-burn tobacco device", a "device for vaporising tobacco products", and the like, with this being interpreted as a device suitable for achieving these effects. The features disclosed herein are equally applicable to devices which are designed to vaporise any aerosol substrate.

The aerosol generation device 1 may be arranged to receive the aerosol substrate in a pre-packaged substrate carrier. The substrate carrier may broadly resemble a cigarette, having a tubular region with an aerosol substrate arranged in a suitable manner. Filters, vapour collection regions, cooling regions, and other structure may also be included in some designs. An outer layer of paper or other flexible planar material such as foil may also be provided, for example to hold the aerosol substrate in place, to further the resemblance of a cigarette, etc. The substrate carrier may fit within the heating chamber or may be longer than the heating chamber such that the lid remains open while the aerosol generation device 1 is provided with the substrate carrier. In such embodiments, the aerosol may be provided directly from the substrate carrier which acts as a mouthpiece for the aerosol generation device.

As used herein, the term "fluid" shall be construed as generically describing non-solid materials of the type that are capable of flowing, including, but not limited to, liquids, pastes, gels, powders and the like. "Fluidized materials" shall be construed accordingly as materials which are inherently, or have been modified to behave as, fluids. Fluidization may include, but is not limited to, powdering, dissolving in a solvent, gelling, thickening, thinning and the like.

As used herein, the term "volatile" means a substance capable of readily changing from the solid or liquid state to the gaseous state. As a non-limiting example, a volatile substance may be one which has a boiling or sublimation temperature close to room temperature at ambient pressure. Accordingly "volatilize" or "volatilise" shall be construed as meaning to render (a material) volatile and/or to cause to evaporate or disperse in vapour.

As used herein, the term "vapour" (or "vapor") means: (i) the form into which liquids are naturally converted by the action of a sufficient degree of heat; or (ii) particles of liquid/moisture that are suspended in the atmosphere and visible as clouds of steam/smoke; or (iii) a fluid that fills a space like a gas but, being below its critical temperature, can be liquefied by pressure alone.

Consistently with this definition the term "vaporise" (or "vaporize") means: (i) to change, or cause the change into vapour; and (ii) where the particles change physical state (i.e. from liquid or solid into the gaseous state).

As used herein, the term "atomise" (or "atomize") shall mean: (i) to turn (a substance, especially a liquid) into very small particles or droplets; and (ii) where the particles remain in the same physical state (liquid or solid) as they were prior to atomization.

As used herein, the term "aerosol" shall mean a system of particles dispersed in the air or in a gas, such as mist, fog, or smoke. Accordingly the term "aerosolise" (or "aerosolize") means to make into an aerosol and/or to disperse as an aerosol. Note that the meaning of aerosol/aerosolise is consistent with each of volatilise, atomise and vaporise as defined above. For the avoidance of doubt, aerosol is used to consistently describe mists or droplets comprising atomised, volatilised or vaporised particles. Aerosol also includes mists or droplets comprising any combination of atomised, volatilised or vaporised particles.

The invention claimed is:

1. An aerosol generating device comprising:
   a housing comprising a mouth end and an opposing end, the opposing end comprising a vent hole;
   a battery within the housing, the battery comprising a vent point in an outer surface of the battery, the vent point arranged such that fluid is released from the vent point during degassing of the battery; and
   a fluid directing arrangement within the housing, the fluid directing arrangement configured to define a fluid flow path from the vent point of the battery to the vent hole of the housing.

2. The aerosol generating device of claim 1, wherein the vent point is positioned at one end of the battery and the fluid directing arrangement comprises an annular support positioned between said one end of the battery and the vent hole such that the fluid flow path is directed through the annular support from the vent point towards the vent hole.

3. The aerosol generating device of claim 1, wherein the vent point is positioned at one end of the battery, the device further comprising:
   a vibrator element positioned adjacent to said one end of the battery; wherein the fluid directing arrangement comprises a vibrator element support which is configured to hold the vibrator element and direct the fluid flow path around the vibrator element from the vent point to the vent hole.

4. The aerosol generating device of claim 1, wherein the fluid directing arrangement further comprises:
   a baffle positioned between a side surface of the battery and an adjacent inner surface of the housing to seal a space between the battery and the housing and restrict a fluid flow towards the mouth end of the housing.

5. The aerosol generating device of claim 4, wherein the baffle comprises a concave surface directed towards the vent hole in the housing such that a fluid flow towards the baffle is redirected in an opposing direction towards the vent hole.

6. The aerosol generating device of claim 4, wherein the fluid directing arrangement further comprises a deflector plane positioned adjacent to the vent point of the battery, the deflector plane configured to redirect a fluid towards the baffle.

7. The aerosol generating device of claim 1, further comprising a vibrator element positioned between a side surface of the battery and an adjacent inner surface of the housing.

8. The aerosol generating device of claim 4, further comprising a vibrator element positioned between a side surface of the battery and an adjacent inner surface of the housing, and wherein the baffle is a support for the vibrator element.

9. The aerosol generating device of claim 1, further comprising an absorbent pad.

10. The aerosol generating device of claim 9, wherein the absorbent pad is annular and positioned adjacent to the vent point of the battery.

11. The aerosol generating device of claim 9, wherein the fluid directing arrangement comprises an annular support and the absorbent pad is positioned within the annular support.

12. The aerosol generating device of claim 1, further comprising a sticker positioned over the vent hole on an outer surface of the housing, the sticker configured to be displaced to open the vent hole during degassing of the battery.

13. The aerosol generating device of claim 1, further comprising a cavity within the housing adjacent to the vent point configured to receive a fluid expelled from the battery during degassing.

14. The aerosol generating device of claim 1, further comprising a battery support frame which holds the battery, the battery support frame positioned across an internal volume of the housing so as to seal the battery in one portion of the internal volume of the housing.

15. The aerosol generating device of claim 1, wherein the vent hole comprises a supporting element arranged across the vent hole to prevent opposing edges of the vent hole from closing.

16. A housing for an aerosol generating device, the housing comprising a mouth end, an opposing end comprising a vent hole; and a fluid directing arrangement within the housing,
   wherein the fluid directing arrangement is configured to define a fluid flow path from the vent hole of the housing to a vent point in an outer surface of a battery when the battery is received within the housing, the vent point for releasing fluid during degassing of the battery.

* * * * *